United States Patent
Neubauer et al.

(10) Patent No.: US 12,128,509 B2
(45) Date of Patent: Oct. 29, 2024

(54) METHOD FOR JOINING TWO METALLIC, TUBULAR JOINING MEMBERS AND A CORRESPONDING WELDING APPARATUS

(71) Applicant: Viega Technology GmbH & Co. KG, Attendorn (DE)

(72) Inventors: Franziska Neubauer, Attendorn (DE); Frank Mänken, Henstedt-Ulzburg (DE); Andreas Müller, Freudenberg (DE); Guido Buchholz, Aachen (DE); Matthias Angerhausen, Krefeld (DE); Benjamin Ebert, Aachen (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 18/579,471

(22) PCT Filed: Jul. 14, 2022

(86) PCT No.: PCT/DE2022/100505
§ 371 (c)(1),
(2) Date: Jan. 15, 2024

(87) PCT Pub. No.: WO2023/284917
PCT Pub. Date: Jan. 19, 2023

(65) Prior Publication Data
US 2024/0261885 A1    Aug. 8, 2024

(30) Foreign Application Priority Data
Jul. 16, 2021   (DE) ..................... 10 2021 118 461.4

(51) Int. Cl.
*B23K 9/09*   (2006.01)
*B23K 9/173*   (2006.01)
(Continued)

(52) U.S. Cl.
CPC .............. *B23K 9/092* (2013.01); *B23K 9/093* (2013.01); *B23K 9/1735* (2013.01);
(Continued)

(58) Field of Classification Search
CPC ...... B23K 9/092; B23K 9/093; B23K 9/1735; B23K 33/006; B23K 37/0276; B23K 2103/04; B23K 2101/06
(Continued)

(56) References Cited

U.S. PATENT DOCUMENTS 3,583,982 A    6/1971   Capp et al.
4,421,972 A    12/1983  Duncan et al.
(Continued)

FOREIGN PATENT DOCUMENTS

DE    3545158 A1    6/1987
EP    3650157 A1    5/2020
(Continued)

OTHER PUBLICATIONS

Caborn, "Fabrication of the Astute class submarine", Welding and Cutting DVS, 2009, p. 338-341, No. 6, ISSN: 1612-3433, XP001550071.
Kruger, "Vollmechanisches Wolfram-Intertgas-Schweißen bei der Montage von Hochdruckrohrleitungen", Schweia En Und Schneiden, 1975, p. 61-64, vol. 27, No. 2, XP001340014, table 1.
(Continued)

*Primary Examiner* — Dana Ross
*Assistant Examiner* — Joseph W Iskra
(74) *Attorney, Agent, or Firm* — The Webb Law Firm

(57) ABSTRACT

A method for joining two metallic, tubular joining members to one another, the method including arranging two metallic, tubular joining members with respect to one another in an overlapping or end-face manner, and joining the joining members by material bond along a joining zone of the joining members. In the joining, a chain of joining spots extending in the circumferential direction of the joining members is produced in the joining zone, wherein successive joining spots in the chain overlap, wherein, in the
(Continued)

joining, the joining spots are produced by means of TIG pulse welding with an arc time of up to 100 ms, preferably of up to 50 ms, wherein an arc of a welding pulse of the TIG pulse welding is extinguished after the arc time has been reached. A corresponding welding apparatus is also described.

16 Claims, 5 Drawing Sheets

(51) Int. Cl.
    *B23K 33/00*     (2006.01)
    *B23K 37/02*     (2006.01)
    *B23K 101/06*     (2006.01)
    *B23K 103/04*     (2006.01)

(52) U.S. Cl.
    CPC ........ *B23K 33/006* (2013.01); *B23K 37/0276* (2013.01); *B23K 2101/06* (2018.08); *B23K 2103/04* (2018.08)

(58) Field of Classification Search
    USPC ......................................................... 219/75
    See application file for complete search history.

(56) References Cited

U.S. PATENT DOCUMENTS

| 2006/0213893 | A1* | 9/2006 | McGushion | ........... B23K 9/092 |
| | | | | 219/60 A |
| 2021/0053135 | A1* | 2/2021 | Jones | ................... B23K 9/0286 |
| 2021/0060680 | A1 | 3/2021 | Enyedy | |
| 2021/0402499 | A1 | 12/2021 | Tamm et al. | |

FOREIGN PATENT DOCUMENTS

| GB | 1170113 A | 11/1969 |
| JP | 2010253488 A | 11/2010 |
| JP | 2012236217 A | 12/2012 |

OTHER PUBLICATIONS

Rehm GmbH u. Co. KG: Betriebsanleitung WIG-Schutzgas-Schweißanlage—English Translation, Tiger 170/210DC/AC/DC/SET. Ausgabedatum. Jun. 8, 2013; Firmenschrift. URL: https://www.rehmonline.de/de/downloads/betriebsanleitungen/tiger-170-210-dc-acdc/bedienungsanleitung-tiger-170-210-dc-acdc-de.pdf [abgerufen am Nov. 3, 2022].

Troyer, "U.S. developments in TIG welding", Metal Construction and British Welding Journal, 1972, p. 376-378, vol. 41, No. 10, XP001341290.

* cited by examiner

METHOD FOR JOINING TWO METALLIC, TUBULAR JOINING MEMBERS AND A CORRESPONDING WELDING APPARATUS

CROSS-REFERENCE TO RELATED APPLICATIONS

This application is the United States national phase of International Application No. PCT/DE2022/100505 filed Jul. 14, 2022, and claims priority to German Patent Application No. 10 2021 118 461.4 filed Jul. 16, 2021, the disclosures of which are hereby incorporated by reference in their entireties.

BACKGROUND OF THE INVENTION

Field of the Invention

The invention is based on a method for joining two metallic, tubular joining members to one another, the method comprising: arranging two metallic, tubular joining members with respect to one another in an overlapping or end-face manner, and joining the joining members by material bond along a joining zone of the joining members.

Description of Related Art

For joining pipes, TIG butt welding for steel pipes, brazing using solder fittings or capillary brazing for copper pipes, for example, have become established methods. In the joining processes for material bonds, it is necessary that the tubular joining members to be joined together are filled with a shielding gas for the joining process in order to guarantee the seam quality and at least largely avoid tempering colors. A method of joining metallic tubular members is described in 2021/053135 A1 and S 2006/213893 A1. A further method and a corresponding welding apparatus are known from EP 3650157 A1.

SUMMARY OF THE INVENTION

It is therefore the object of the invention to further develop the method described at the beginning and a corresponding welding apparatus in such a way that the filling of the tubular joining members to be joined with a shielding gas can be dispensed with, while at the same time the formation of tempering colors should be at least largely suppressed.

This object is solved by a method with the features as described herein. A corresponding welding apparatus is the subject as described herein. Advantageous embodiments of the invention are respectively described herein.

In a method for joining two metallic, tubular joining members of the type described at the beginning, it is provided that, in the joining, a chain of joining spots extending in the circumferential direction of the joining members is produced in the joining zone, wherein successive joining spots in the chain overlap. According to the invention, it is provided that, in the joining, the joining spots are produced by means of TIG pulse welding with an arc time of up to 100 ms, wherein an arc of a welding pulse of the TIG pulse welding is extinguished after the arc time has been reached. By extinguishing the arc after the arc time has been reached, further heat input into the joining members can be suppressed, for example. It may be provided for the arc to be extinguished after each individual joining spot has been joined. In some embodiments, in the joining, the joining spots can be produced by means of TIG pulse welding with an arc time of up to 50 ms.

The tubular joining members may, for example, be two pipes that are arranged with respect to one another in an overlapping manner or butt-to-butt manner. The two joining members may be a pipe and a sleeve or fitting pushed onto the pipe in an overlapping manner. Conversely, the sleeve or fitting may also be female and pushed onto a male end of a pipe.

The welding spots or joining spots, respectively, may preferably be generated with a welding current (guide current) of more than 100 A. Preferably, the welding current is more than 200 A and particularly preferably more than 250 A. The welding current may be zero if the arc has been or is extinguished.

The welding spots or joining spots, respectively, may be produced sequentially in the joining zone. A cooling time that corresponds to at least the arc time and preferably at least twice and particularly preferably at least three times the arc time can be maintained between the production of welding spots or joining spots, respectively, following one another in time. Accordingly, the welding spots following one another in time may be produced by means of sequential interval welding of individual welding spots.

Due to the overlap of successive joining spots in the chain, a continuous joining seam can be produced. When joining, the joining spots following one another in the chain may be produced with an overlap of 10% to 80% of their respective joining area. Preferably, the overlap is between 20% and 50% of the area of each joining spot In order to further improve the heat dissipation from the joining zone into the joining members to be joined together, provision may be made to generate, in the joining, the successive joining spots following one another in the final chain forming the continuous joining seam in a stochastic sequence.

The joining may comprise, for producing one of the joining spots, the contactless ignition of an arc using a high-frequency process to produce a welding spot or joining spot, respectively.

After the contactless ignition of the arc and after the extinguishing of the contactlessly ignited arc, provision may be made to displace a welding electrode along the joining zone by an integer multiple of a step width. For a given welding spot diameter, the step width may be at least 10%, preferably at least 15%, and particularly preferably at least 20% smaller than the welding spot diameter.

In joining, in particular by means of TIG pulse welding, the welding energy for producing one of the welding spots or joining spots, respectively, may be used as reference variable. For this purpose, the method may comprise continuous or iterative determining of the instantaneous power of a welding energy source during the production of a welding spot or joining spot, respectively, and integrating the instantaneous power thus determined over time. A sampling rate for determining the instantaneous power may preferably be more than 10 KHz.

The welding energy source may be interrupted when the integrated instantaneous power reaches a joining spot target energy. In this way, with knowledge of the other material properties of the joining members, the thermal energy introduced into the joining members to be joined may be regulated, thereby suppressing the formation of undesirable tempering colors particularly effectively.

Before joining, the method may comprise provision of a seam preparation, whereby at least one of the two tubular joining members is provided with an additional material shaping on an end face facing the joining zone. In this, a seam preparation can be provided in which the additional material shaping has a rectangular or triangular material shoulder, which preferably has dimensions in the range of 10-60% of the wall thickness of the tubular joining member (1) having the additional material shaping (6).

The joining may comprise controlling a welding current in TIG pulse welding, wherein the welding current follows a target pulse profile comprising the following target pulse phases:

a. adjusting the welding current to zero to two times the energy phase current level during a start phase duration, which start phase duration corresponds to zero to two times the energy phase duration, then b. increasing the welding current to an energy phase current level of 80 to 400 A during an energy phase duration between 5 and 45 ms; and then c. decreasing the welding current to zero to two times the energy phase current level during a final phase duration, the final phase duration corresponding to zero to two times the energy phase duration.

According to another aspect, a welding apparatus for carrying out the method described above is proposed, which has a welding energy source with at least one welding electrode and a measuring and control unit, wherein the at least one welding electrode is guided on a circular path by a drive of the welding apparatus. The welding apparatus is characterized in that the at least one welding electrode guided on a circular path is configured to produce a weld seam of a chain of welding spots running in the circumferential direction of two metallic, tubular joining members to be joined together, in such a way that successive welding spots in the chain overlap. The welding apparatus may therefore be designed in the manner of an orbital welding apparatus, but is not limited to such embodiments.

The welding energy source may have a plurality of welding electrodes that are arranged at a distance from one another along the circular path. The plurality of welding electrodes may be arranged at a fixed or an adjustable distance from one another. In particular, the different welding electrodes may be individually controllable, in particular may be supplied with a welding current independently of each other.

The at least one welding electrode may, in the lap joint of the tubular joining members, be arranged at an angle of inclination of between 45° and 55° to the parallel outer sides of the joining members. Preferably, the welding electrode may have, with respect to a fillet base point of the joining zone, a side offset of 0.3 to 0.7 mm or 30-70% of the wall thickness of one of the two tubular joining members perpendicular to the outside of the male joining member and a height offset of 0.2 to 0.8 mm, preferably 0.2 to 0.6 mm, or 20-60% of the wall thickness of one of the two tubular joining members perpendicular to the end face of the female joining member facing the joining zone.

The drive may comprise a step drive with a step width in the circumferential direction of the joining members that, for a given welding spot diameter, is at least 10%, preferably at least 15%, particularly preferably at least 20%, smaller than the welding spot diameter.

Furthermore, the welding apparatus may have a mains power connection or a rechargeable battery as energy source, a welding inverter for generating short welding current pulses, an HF ignition for the arc, a welding electrode in a welding head, which holds the tubular joining members to be joined together, which welding electrode can be moved orbitally with a motor via a gearbox, and a container with a valve for supplying a shielding gas. The welding head may also serve as a positioning tool for the defined, relative feeding and arrangement of the joining members to each other and for implementing and maintaining technical welding parameters. The welding head may be designed in such a way that it can be converted for different applications. The welding apparatus may comprise a control unit that is configured to ensure the purging of the joining zone with a shielding gas on an outer side of the joining members to be joined. The control unit may further be configured to ensure the purging of the joining location with shielding gas from the outside and the triggering of the welding pulses as well as the movement of the welding electrode in a suitable spatial and temporal distribution orbitally along the joining zone. The welding apparatus may generally be designed as a mobile, hand-held welding apparatus or as a stationary apparatus.

BRIEF DESCRIPTION OF THE DRAWINGS

The terms Fig., Figs., Figure, and Figures are used interchangeably to refer to the corresponding figures in the drawings Further details of the invention are explained with reference to the figures below. In the Figures

DESCRIPTION OF THE INVENTION

Figure 1:
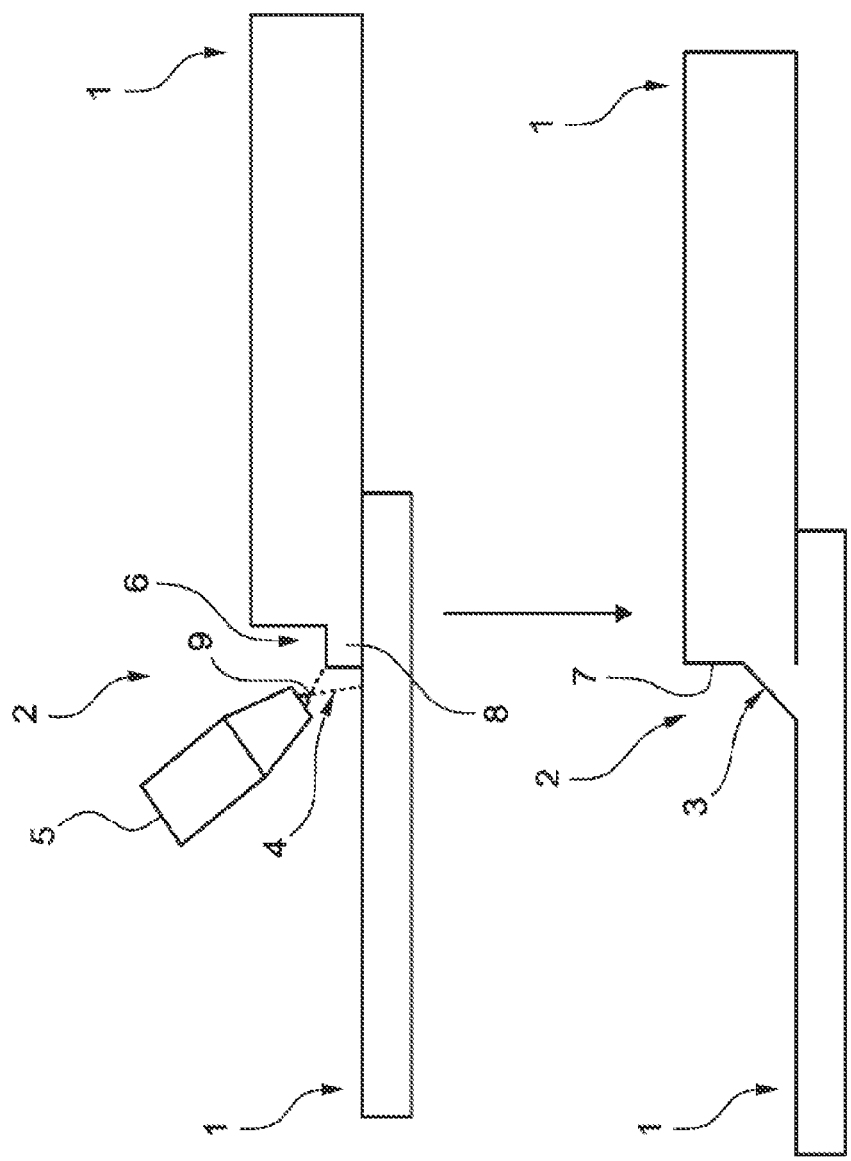
FIG. 1 shows, in a schematic representation, the formation of a joining spot.

FIG. 1 shows, in a schematic representation, the formation of a joining spot 3. The two joining members 1 to be joined together are arranged to one another in an overlap joint, wherein a male joining member 1 protrudes at least with a section into the female joining member 1. The outer diameter of the male joining member 1 essentially corresponds to the inner diameter of the female joining member 1. In order to provide an additional material for producing the joining spot 3, the female joining member 1 has an additional material shaping 6 on its end face 7 facing the male joining member 1, which additional material shaping melts during the subsequent TIG pulse welding and forms a material bond with the two joining members 1 to form the joining spot 3.

The additional material shaping 6 is provided as a material shoulder 8 on the end face 7. For this purpose, the outer diameter of the female joining member 1 in the area of the additional material shaping 6 can be reduced compared to the remaining outer diameter of the female joining member 1, for example by approximately two thirds of the wall thickness of the female joining member 1. The material shoulder 8 causes the female joining member 1 with its inner circumference, with which it is in contact with the outer circumference of the male joining member 1, to have a greater axial overlap with the male joining member 1 compared to its outer circumference.

The geometry of the two joining members 1 in the joining zone 2 may thus be designed in such a way that, due to the geometry and mass distribution of one of the two joining members 1, the melting process is influenced by the resulting heat conduction and heat concentration and thus a defined base material depot can be used as an additional material substitute. For example, as shown in FIG. 1, the female joining member 1 may have the aforementioned rectangular or triangular material shoulder 8, which may have dimensions of between 0.2 to 0.6 mm×0.2 to 0.6 mm, for example.

Figure 3:
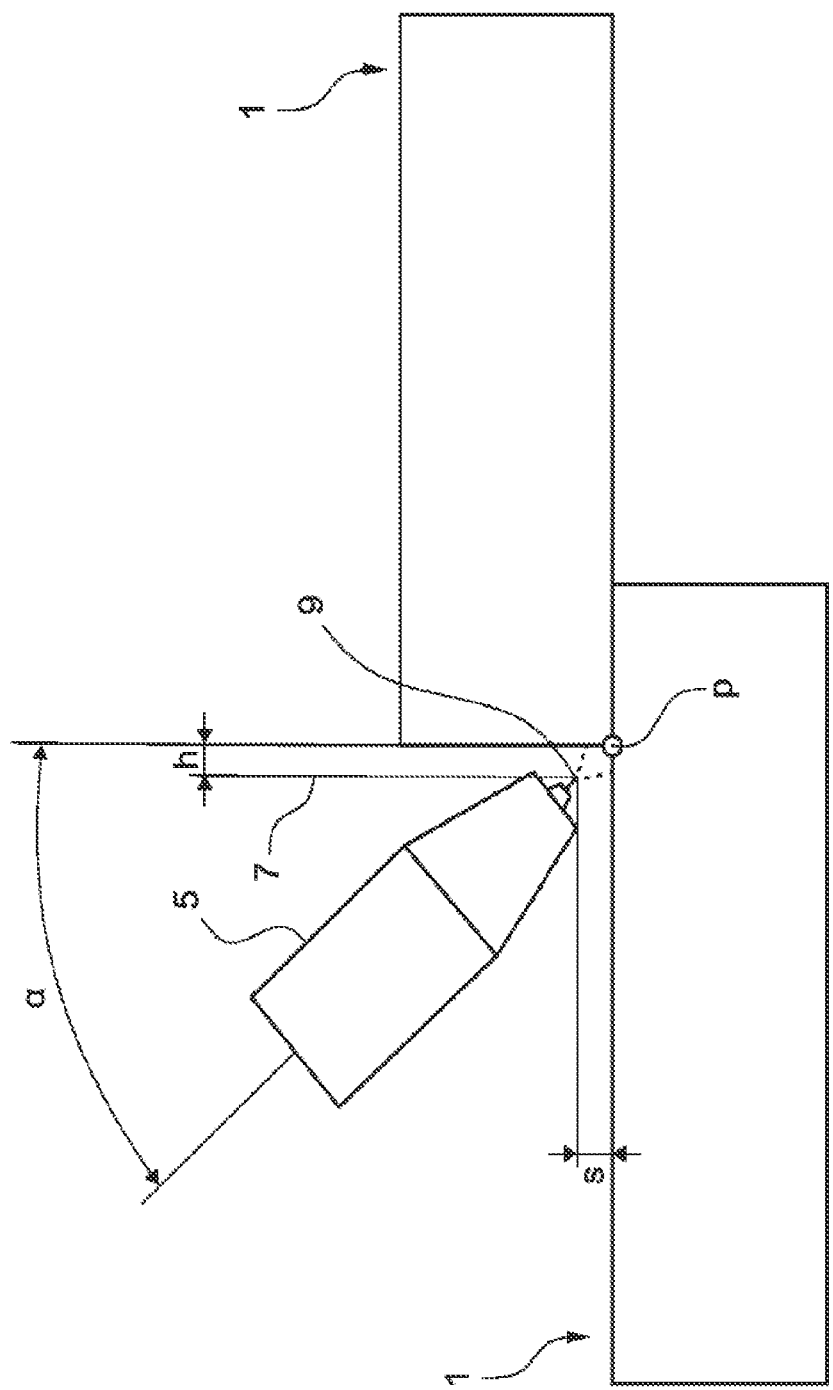
FIG. 3 shows, in schematic representation, the spatial arrangement of a welding energy source with respect to joining members arranged in an overlap joint.

The welding energy source 5 may, for example, be an energy source for TIG pulse welding. A welding electrode 9 of the welding energy source 5 may be arranged at an acute angle (see angle α in FIG. 3), for example at a 45° angle to the end face 7 of the female joining member 1. As shown in FIG. 3, in addition to the angle α of the electrode 9 with respect to the front face 7 of the female joining member 1, the electrode 9 may maintain a side offset s and a height offset h with respect to a fillet base point P. The side offset s may, for example, be between 0.3 and 0.7 mm or 30-70% of the wall thickness of one of the two tubular joining members. Preferably, the side offset s is 0.5 mm. The height offset h may, for example, be between 0.2 and 0.6 mm or 20-60% of the wall thickness of one of the two tubular joining members. Preferably, the height offset h is 0.4 mm. The side offset s and the height offset h will depend in particular on the selected joining members, especially on the materials of the joining members, their diameters and their wall thicknesses.

Provision is made for producing, in the joining, individual joining spots which, with an overlap, form a chain of connected joining spots and thus a continuous, material bond between the joining members 1. The overlap may, for example, be 20% to 50% of the respective welding spot area. The sequence in which the welding spots are produced along the outer circumference in the joining zone may be set variably of the joining members 1 to be joined, both in terms of the spatial distribution and the time sequence of the production of the welding spots. In particular, it is not absolutely necessary for the individual welding spots to be produced in the order in which they are arranged with respect to each other in the chain of individual welding spots that forms the continuous weld seam produced at the end of the complete joining process.

In particular, the suppression of tempering colors can be further improved by maintaining the greatest possible spatial distance between successively produced welding spots. The time sequence in which timely successive welding spots are produced may depend on the heat conduction properties of the joining members. By further considering the heat energies introduced when producing the joining spots in conjunction with the spatial arrangement of successive welding spots in the joining process, for example depending on the distance between these along the outer circumference of the joining members, a temporal distance may be selected which ensures the effective suppression of tempering colors.

For example, if the male joining member 1 is a tube made of V2A steel with a diameter of 28 mm and a wall thickness of one millimeter and the female joining member is a sleeve made of the same material with a wall thickness of 1.2 mm, a welding lens diameter of 2.5 mm and a guide current of 280 A with a pulse duration of 25 ms and a joining spot target energy of 25 J can be provided for joining the two joining members 1 using TIG pulse welding. The angle of inclination a according to FIG. 3 relative to the end face 7 can, for example, be 50° with a height offset h of 0.5 mm and a side offset s of 0.4 mm. Successive welding spots may herein be arranged on opposite sides on the outer circumference of the joining zone to maximize the heat dissipation of the pulse energy into the joining members.

Accordingly, the welding spots may be produced using TIG pulse welding, for example, whereby the two joining members 1 are locally melted by short welding pulses with an arc time of at most 50 ms and thereby materially bonded. Arc burning times of up to 300 ms may also be considered for joining copper, wherein the arc burning time is preferably up to 20 ms, for example for CrNi, or up to 100 ms, for example for Cu. It is possible to work with or without filler material. The arc of the welding pulse may be ignited without contact using the HF process. Once the arc time has been reached, the welding pulse extinguishes in order to suppress further heat input into the joining members. In other words, the arc of the welding pulse of the TIG pulse welding is extinguished after the arc time has been reached. It may be provided that the arc can be interrupted and/or extinguished after each individual joining spot has been joined. The welding current may be zero when the arc has been or is extinguished.

Figure 2:
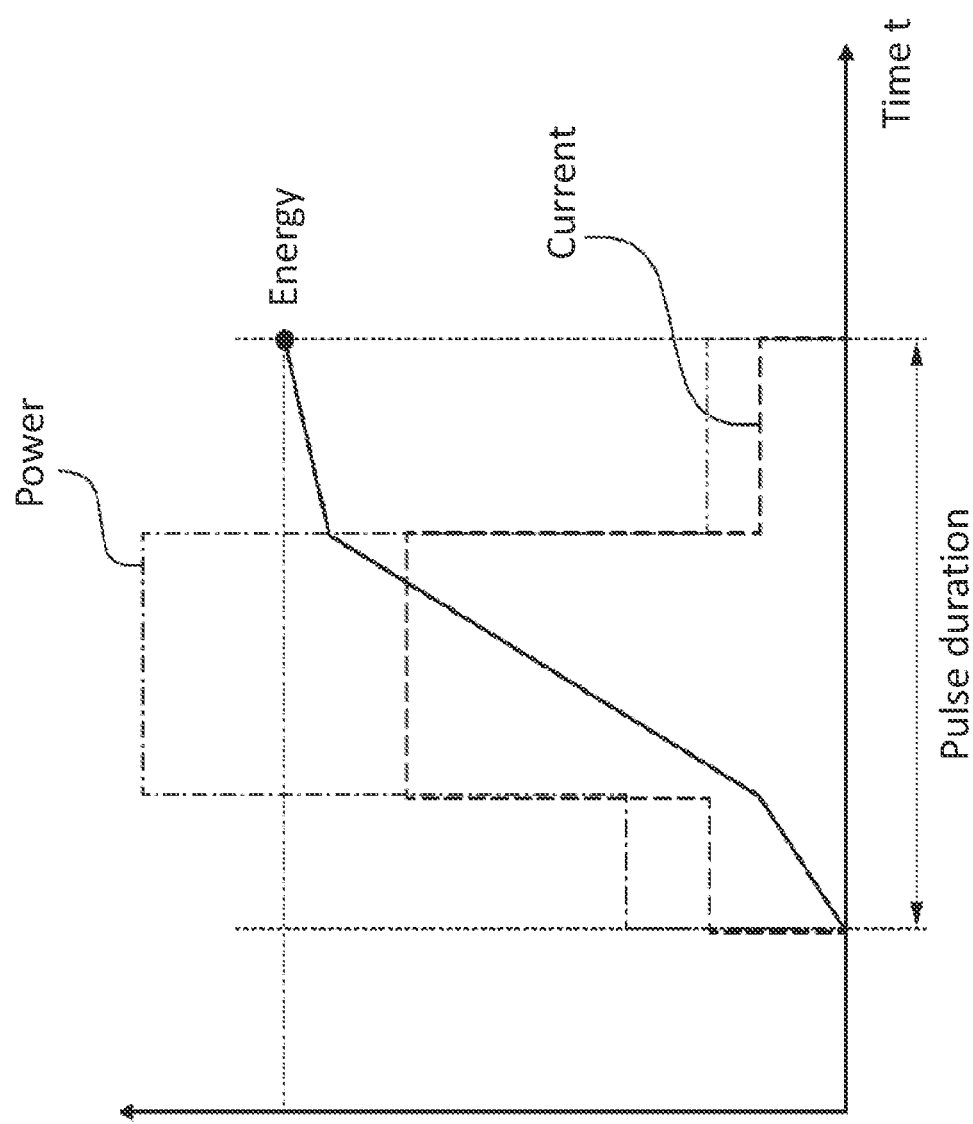
FIG. 2 shows the power, current and energy profile during a TIG welding pulse.

The controlled variable in TIG welding is the welding current, which may follow a defined target pulse profile. This is illustrated with reference to FIG. 2 and divided into a start phase, an energy phase and a final phase. The start phase has a current level that corresponds to 0 to 2 times the energy phase current level, whereby the start phase duration corresponds to 0 to 2 times the energy phase duration. The energy phase has an energy phase current level of 80 to 400 A and an energy phase duration of 5 ms to 45 ms. The final phase has a current level that corresponds to 0 to 2 times the energy phase current level, with a final phase duration that corresponds to 0 to 2 times the energy phase duration.

The start phase is used to establish the arc and activate the surfaces of the joining members. The energy phase is used to transport the melting energy into the joining zone, while the end phase is provided for post-heating the melting zone without increasing the size of the weld pool. The welding voltage adjusts itself according to the geometric and physical boundary conditions.

Taking into account and adhering to technological parameters (torch position, electrode distance to the workpiece, etc.), the current shaping over the profile of the pulse leads to an energy regulation that allows the forming and locally limited metal melt to subcool and solidify instantly by conductive heat dissipation into the remaining solid material and by heat dissipation to the further flowing shielding gas and the atmosphere. In addition, the HF process prevents the electrode from sticking to the workpiece surface during the ignition of the arc, thus reducing electrode wear.

The high temperature gradients into the surrounding material ensure that high cooling rates are achieved so that the inside of the tube is not thermally activated, thus preventing oxidation and tempering colors. The superordinate reference variable for the production of a welding spot is therefore the energy applied for the production of the individual welding spot, which is implemented as the integral of the instantaneous power as the product of welding current and welding voltage by the arc as an energy converter. It may be provided that during the generation of the welding spot, i.e. for example during a welding pulse, in-situ, the instantaneous power of the arc is recorded with a sampling rate of more than 10 kHz and the continuous formation of the integral over time. The welding pulse can therefore be terminated precisely when the target welding spot energy is reached.

Figure 4:
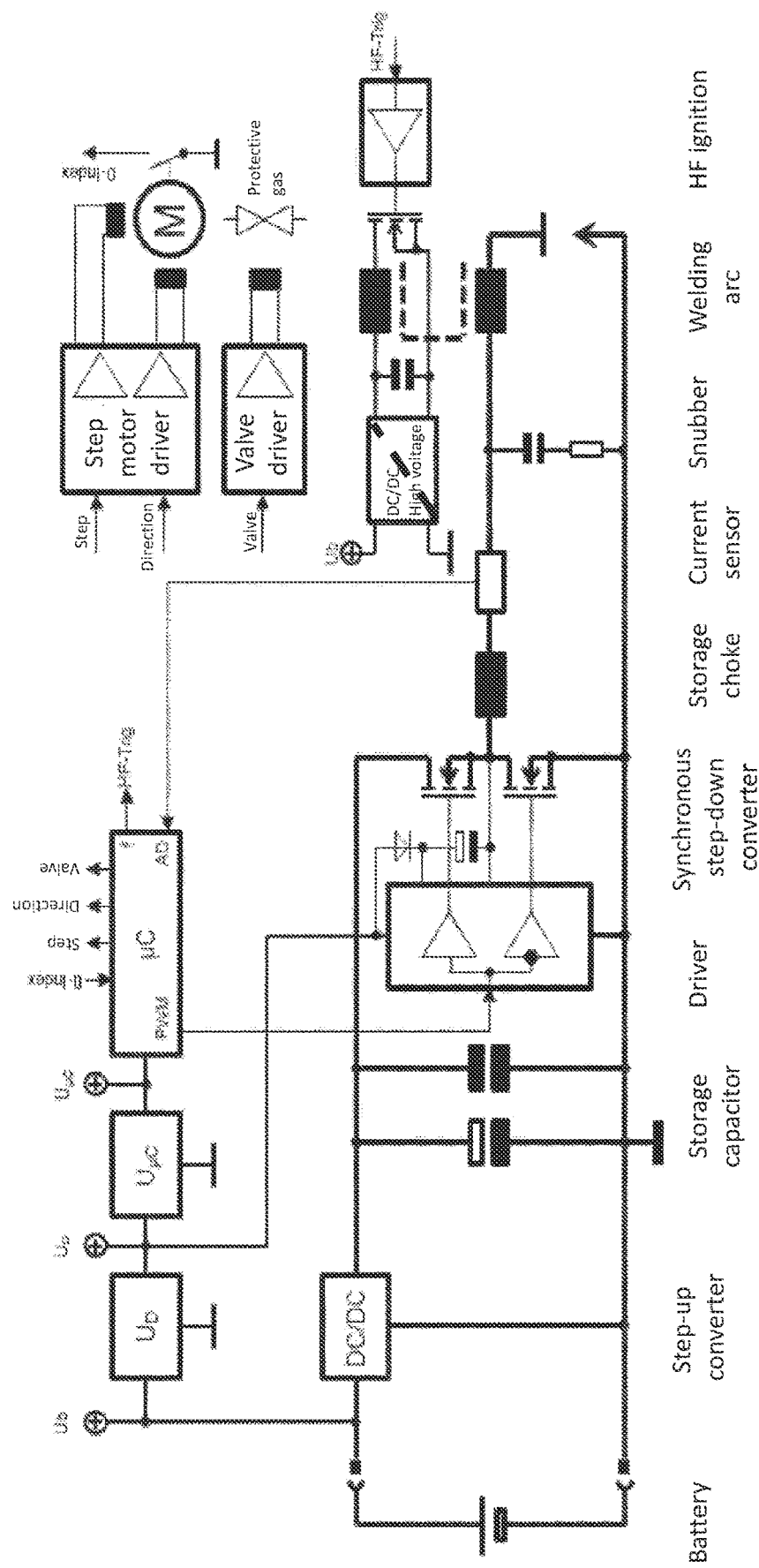
FIG. 4 shows a simplified circuit diagram of an exemplary embodiment of a welding apparatus.
Figure 5:
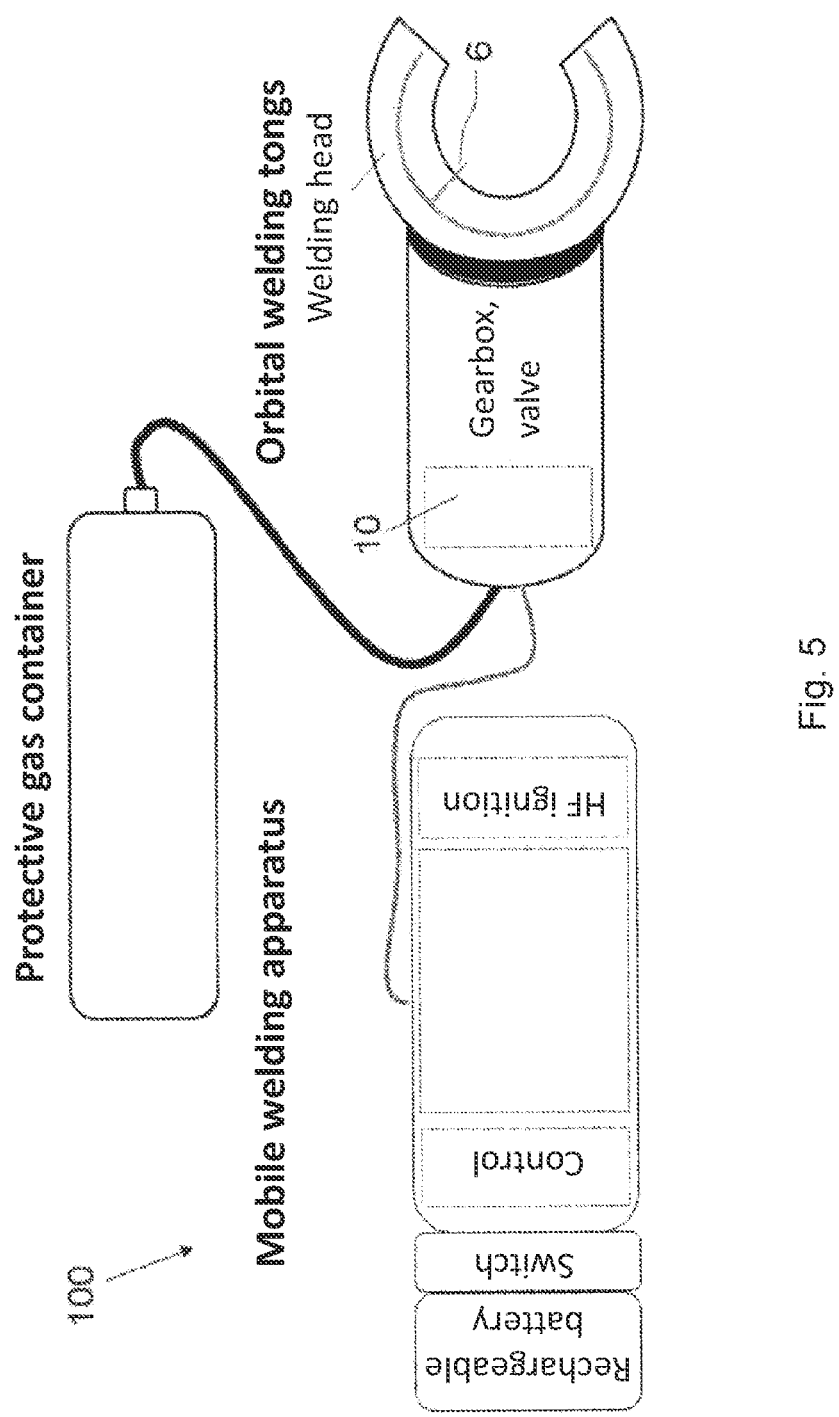
FIG. 5 shows, in schematic representation, the functional groups of an exemplary embodiment of a welding apparatus according to the invention.

As shown in FIGS. 4 and 5, a welding apparatus 100 may be provided for implementing the method according to the invention, which may be designed, for example, as a mobile welding apparatus, i.e. a self-contained, easily transportable apparatus. The welding apparatus 100 may have a mains power connection or a rechargeable battery as an energy source, a welding inverter for generating short welding current pulses, a measuring and control unit which provides the welding parameters and monitors and controls the process, an HF ignition of the arc, at least one welding electrode, which welding electrode may be moved by a motor via a gear orbital, in a welding head, which welding head accommodates the two joining members, for example a pipe end and a fitting, and a container with a valve for supplying a shielding gas.

The welding head also serves as a positioning tool to reproducibly arrange the two joining members in a relative arrangement to each other, for example in an overlap joint while maintaining a specified overlap dimension. An axial and eccentric tolerance of 100 μm may be met. The welding head is further configured to displace the welding electrode to implement and meet the geometric positioning parameters for the welding process to form the welding spot chain. The geometric positioning parameters may be the angle of inclination of the electrode 6 with respect to the joining zone, the previously mentioned side offset and the height offset (see FIG. 3).

The welding head may have a modular design so that it can be converted for different applications, for example to cover different diameter ranges of the tubular joining members to be joined together. The control of the welding apparatus 100 coordinates the purging of the joining zone with shielding gas, the triggering of the welding pulses and the movement of the welding electrode orbitally around the joining zone in a suitable spatial and temporal distribution.

Thus, a simple welding process suitable for construction sites and a corresponding welding apparatus for pipe connections are provided. The method makes it possible to produce mechanically strong and fluid-tight pipe connections in a short time. In addition, the method allows the welding apparatus to be provided in a compact design, thus ensuring low effort in terms of transportation and operation on the construction site.

By taking into account the thermal material and workpiece properties and through targeted modulation of the current and power profile, the energy input and its spatial distribution during welding may be optimized in such a way that, as a consequence, the average and transient energy input is designed in such a way that it is possible to effectively dispense with filling the pipes with forming gas or shielding gas to suppress tempering colors. This also has the great advantage that the relevant regulations regarding fire protection on the construction site can be met with less effort.

The features of the invention disclosed in the above description, in the drawing and in the claims may be essential for the realization of the invention either individually or in any combination.

LIST OF REFERENCE NUMERALS

1 joining member
2 joining zone
3 joining spot
4 arc
5 welding energy source
6 additional material shaping
7 front side
8 material shoulder
9 welding electrode
10 drive
100 welding apparatus
a Angle of inclination
h height offset
S Side offset
P fillet base point

The invention claimed is:

1. A method for joining two metallic, tubular joining members to one another, the method comprising: arranging two metallic, tubular joining members with respect to one another in an overlapping or end-face manner, and joining the joining members by material bond along a joining zone of the joining members, wherein, in the joining, a chain of joining spots extending in the circumferential direction of the joining members is produced in the joining zone, wherein successive joining spots in the chain overlap, characterized in that, in the joining, the joining spots are produced by means of TIG pulse welding with an arc time of up to 100 ms, preferably of up to 50 ms, wherein an arc of a welding pulse of the TIG pulse welding is extinguished after the arc time has been reached.

2. The method according to claim 1, in wherein the joining spots are produced with a welding current of more than 100 A.

3. The method according to claim 1, wherein, the joining spots are produced sequentially in the joining zone, wherein a cooling time is maintained between the production of joining spots following one another in time, which cooling time corresponds to at least the arc time, preferably at least twice the arc time, particularly preferably at least three times the arc time.

4. The method according to claim 1, wherein, in the joining, the joining spots following one another in the chain are produced with an overlap of 20% to 50% of their respective joining area.

5. The method according to claim 1, wherein, in the joining, the joining spots following one another in the chain are generated in a stochastic sequence.

6. The method according to claim 1, wherein the joining for producing one of the joining spots comprises the contactless ignition of an arc in a high-frequency process.

7. The method according to claim 6, wherein after the contactless ignition of the arc and after the extinguishing of the contactlessly ignited arc, comprises: displacing a welding electrode along the joining zone by an integer multiple of a step width, which step width, for a given joining spot diameter, is at least 10%, preferably at least 15% and particularly preferably at least 20% smaller than the joining spot diameter.

8. The method according to claim 1, wherein, in the joining, the welding energy for generating one of the joining spots is used as a reference variable, for which the method comprises continuously or iteratively determining of the instantaneous power of a welding energy source and integrating of the determined instantaneous power over time, wherein a sampling rate for determining the instantaneous power is preferably more than 10 KHz.

9. The method according to claim 8, wherein
the welding energy source is interrupted when the integrated instantaneous power reaches a joining spot target energy.

10. The method according to claim 1, wherein, before the joining, comprises: providing a seam preparation, wherein at least one of the two tubular joining members has an additional material shaping on an end face facing the joining zone, wherein the additional material shaping preferably projects into the joining zone.

11. The method according to claim 10, in which a seam preparation is provided, in which the additional material shaping has a rectangular or triangular material shoulder, which preferably has dimensions in the range of 10-60% of the wall thickness of the tubular joining member having the additional material shaping.

12. The method according to claim 1, wherein the joining comprises: controlling a welding current in TIG pulse welding, wherein the welding current follows a target pulse profile comprising the following target pulse phases:
   a. adjusting the welding current to zero to two times the energy phase current level during a start phase duration, which start phase duration corresponds to zero to two times the energy phase duration, then
   b. increasing the welding current to an energy phase current level of 80 to 400 A during an energy phase duration of between 5 and 45 ms; and then
   c. decreasing the welding current to zero to two times the energy phase current level during a final phase duration, the final phase duration corresponding to zero to two times the energy phase duration.

13. A welding apparatus for carrying out the method according to claim 1, wherein the welding apparatus has a welding energy source with at least one welding electrode, and a measuring and control unit, wherein the at least one welding electrode is guided on a circular path by a drive of the welding apparatus, wherein the at least one welding electrode guided on a circular path is configured to produce a weld seam of a chain of joining spots running in the circumferential direction of two metallic, tubular joining members to be joined together, in such a way that successive joining spots in the chain overlap, wherein the welding electrode is further configured to produce the joining spots by means of TIG pulse welding with an arc time of up to 100 ms, preferably of up to 50 ms, wherein an arc of a welding pulse of the TIG pulse welding is extinguished after the arc time has been reached.

14. The welding apparatus according to claim 13, wherein the welding energy source has a plurality of welding electrodes, the welding electrodes preferably being individually controllable, which welding electrodes are arranged at a distance from one another along the circular path, the welding electrodes preferably being arranged at a fixed or at an adjustable distance from one another.

15. The welding apparatus according to claim 13, wherein in the lap joint of the tubular joining members, the welding electrode is arranged at an angle of inclination (a) of between 35° and 55° to the parallel outer sides of the joining members and, preferably has, with respect to a fillet base point (P) of the joining zone, a side offset (s) of 30-70% of the wall thickness of one of the two tubular joining members perpendicular to the outside of the male joining member and a height offset (h) of 0.2-0.8 mm, preferably of 0.2-0.6 mm, perpendicular to the end face of the female joining member facing the joining zone.

16. The welding apparatus according to claim 13, wherein the drive comprises a step drive with a step width which, for a given joining spot diameter, is at least 10%, preferably at least 15% and particularly preferably at least 20% smaller than the joining spot diameter.

* * * * *

UNITED STATES PATENT AND TRADEMARK OFFICE
CERTIFICATE OF CORRECTION

| | | |
|---|---|---|
| PATENT NO. | : 12,128,509 B2 | Page 1 of 1 |
| APPLICATION NO. | : 18/579471 | |
| DATED | : October 29, 2024 | |
| INVENTOR(S) | : Franziska Neubauer | |

It is certified that error appears in the above-identified patent and that said Letters Patent is hereby corrected as shown below:

On the Title Page

Column 2, Item (56) Other Publications, Line 3, delete "Intertgas-SchweiBen" and insert -- Inertgas-Schweißen --

In the Claims

Column 8, Line 25, Claim 2, delete "in wherein" and insert -- wherein --

Column 8, Line 28, Claim 3, delete "wherein," and insert -- wherein --

Column 8, Line 35, Claim 4, delete "wherein," and insert -- wherein --

Column 8, Line 39, Claim 5, delete "wherein," and insert -- wherein --

Column 8, Line 65, Claim 10, delete "wherein," and insert -- wherein --

Column 9, Line 27, Claim 13, delete "electrode," and insert -- electrode --

Signed and Sealed this
Thirteenth Day of May, 2025

Coke Morgan Stewart
*Acting Director of the United States Patent and Trademark Office*